United States Patent [19]

Scherer

[11] 3,979,187

[45] Sept. 7, 1976

[54] VACUUM-TIGHT METAL-CERAMIC SOLDERED JOINT

[75] Inventor: Fridolin Scherer, Untersiggenthal, Switzerland

[73] Assignee: BBC Brown Boveri & Company Limited, Baden, Switzerland

[22] Filed: Oct. 1, 1974

[21] Appl. No.: 511,057

[30] Foreign Application Priority Data

Oct. 1, 1973 Switzerland ....................... 14043/73

[52] U.S. Cl. .................................. 29/195; 228/122; 228/903

[51] Int. Cl.$^2$ .......................................... B32B 15/00

[58] Field of Search ........... 29/195 M; 228/122, 903

[56] References Cited

UNITED STATES PATENTS

| | | | |
|---|---|---|---|
| 2,163,407 | 6/1939 | Pulfrich | 29/195 |
| 2,163,410 | 6/1939 | Pulfrich et al. | 29/195 |
| 2,917,140 | 12/1959 | Omley | 29/195 |
| 3,137,545 | 6/1964 | Schultz | 29/195 |
| 3,324,543 | 6/1967 | McVey et al. | 29/195 X |
| 3,340,025 | 9/1967 | Milch et al. | 29/195 |
| 3,418,423 | 12/1968 | Bronnes et al. | 29/195 X |
| 3,666,429 | 5/1972 | Campbell et al. | 29/195 |
| 3,700,420 | 10/1972 | Bristow | 29/195 |

*Primary Examiner*—L. Dewayne Rutledge
*Assistant Examiner*—E. L. Weise
*Attorney, Agent, or Firm*—Oblon, Fisher, Spivak, McClelland & Maier

[57] ABSTRACT

A vacuum-tight metal-ceramic soldered joint and a method of producing such joint wherein the joint includes a ceramic member having an aperture defined therein, a metallic coating on the wall of the aperture, a solderable plug composed of metal powder positioned in the aperture of the ceramic member, and a hole defined in the solderable plug with an electrical and mechanical through-connection positioned therein.

10 Claims, 3 Drawing Figures

VACUUM-TIGHT METAL-CERAMIC SOLDERED JOINT

BACKGROUND OF THE INVENTION

1. Field of the Invention:

The invention relates to a vacuum-tight metal-ceramic soldered joint and a method for producing such joint.

2. Description of the Prior Art:

In the production of vacuum-tight metal-ceramic soldered joints, it is customary to provide the surface of the ceramic part to be soldered with a suitable metal coating, preferably applied by heat, to which the metal part can be soldered by means of soft or hard solder. Hard solders, for example, must be applied in all cases where the joint is required to have high mechanical strength and resistance to thermal stress.

Owing to the fact that the metals used have expansion coefficients differing widely from that of the ceramic, joints of this kind present problems. More particularly, high thermal stresses, which arise from the temperature difference between the soldering temperature and the room temperature of the joint, when in use, can lead to failure of the joint. These problems have hitherto been attempted to be solved by selecting materials having expansion coefficients as similar as possible for the metals to be soldered together and for the ceramic bonded to such materials. Also, by suitably designing the individual junction points, such problems can be avoided.

Metal alloys with a matched expansion coefficient have also been used together with a physical configuration of the seam which by its nature must have a diameter which is as small as possible. In addition to satisfactory wetting of the entire joint with solder through capillary action, these measures result in slight mechanical stress when thermal expansion occurs, owing to the higher expansion coefficient of the hard solder.

SUMMARY OF THE INVENTION

It is therefore an object of the present invention to provide a vacuum-tight metal-ceramic soldered joint whereby a metallic through-connection of as nearly rectangular cross-section as possible is to be soldered to a ceramic plate and the material of the through connection, preferably a spring material will not be altered by elevated temperatures such that the properties of the through connection are not irreversibly changed.

It is further an object of the present invention to provide a vacuum-tight metal-ceramic soldered joint wherein no low-melting soft solder is used.

In accordance with the present invention, the foregoing and other objects are attained by providing a vacuum-tight metal-ceramic soldered joint and a method of producing such joint wherein the joint includes a ceramic member having an aperture defined therein, a metallic coating on the wall of the aperture, a solderable plug composed of metal powder positioned in the aperture of the ceramic member, and a hole defined in the solderable plug with an electrical and mechanical through-connection positioned therein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

One advantage of the present invention is that the solderable plug is of a material of which the thermal expansion coefficient is so chosen that the overall expansion coefficient of the plug together with solder is approximately equal to that of the ceramic. At the same time, it is possible to select for the plug a material which can be wetted by the solder used, or can be made wettable through appropriate treatment, such for example as, coating with metal. The ceramic material used can be, for example, pure aluminum oxide, magnesium oxide, beryllium oxide or zirconium oxide, or mixtures of these pure-oxide ceramics, or a silicate ceramic. The material for the plug is a coated metal powder or metallized ceramic with improved surface wettability, the metals which can be used being tungsten, molybdenum, tantalum, chromium and also alloys of nickel-iron, nickel-chrome-iron, nickel-cobalt-iron and molybdenum-cobalt-iron. The particle sizes of these metals used for the plug can be between $10\mu$ and $100\mu$. Surface treatment can consist of galvanic deposition of a very thick coating of gold, silver, nickel or copper.

In another version of the invention the solderable plug can be of a surface-treated ceramic powder.

In this case, the materials mentioned above can be used, resulting in the advantage that the appropriate powder or powder mixture for the plug filling the aperture can be chosen to suit the material of the ceramic aperture.

In accordance with another form of the invention, a plate of solder is located above the solderable plug, or the plug includes a mixture of solder powder and ceramic powder, or coated metal powder.

The plates of solder used consist of a low-melting silver alloy, or of alloys of cadmium-zinc, the melting points being between 300° and 700°C depending on the solder chosen.

Mixtures of solder powder and ceramic powder, or of solder powder and coated metal powder for the plug are used to advantage in all cases where the soldering temperature must under no circumstances be so high that the spring properties, for example, of the through-connection material are lost.

The method of producing a vacuum-tight metal-ceramic soldered joint is further characterized by the following steps:

a. the inside walls of the aperture in the ceramic are metallized by sintering, b. the solderable plug of metal powder or coated ceramic powder and incorporating a hole for the through connection, is placed in the aperture, c. the through connection is introduced into the hole in the plug, d. the plug is covered with a plate of solder, and e. the pre-treated aperture is heated to the liquidus temperature.

In accordance with another embodiment of the present invention, instead of covering the plug with a plate of solder, the solder can include a powdered solder which is added to the material of the plug.

Figure 1:
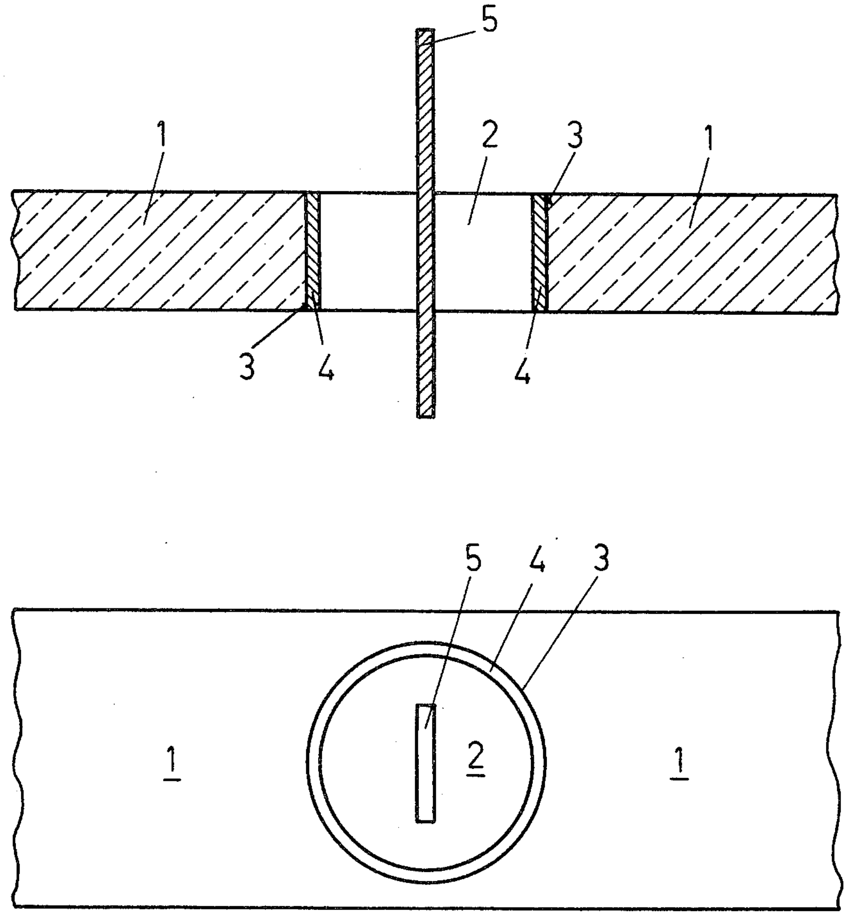
FIG. 1 is a cross-section through a ceramic plate with an aperture therein and a through-connection, and also a plan view of this arrangement.

Referring now to the drawings, and more particularly to FIG. 1 which shows a ceramic plate 1 having an aperture 2 defined therein. The inside walls 3 of aperture 2 are provided with a metallized layer or coating 4. A through-connection 5 of rectangular cross-section, for example, is located in the aperture 2.

FIG. 2 again shows the ceramic plate 1 with aperture 2, the aperture 2 containing a plug 6 which consists of a coated ceramic powder or a metal powder and closely surrounds the through-connection 5. The surface of the plug 6 is covered by a plate of solder 7.

Figure 3:
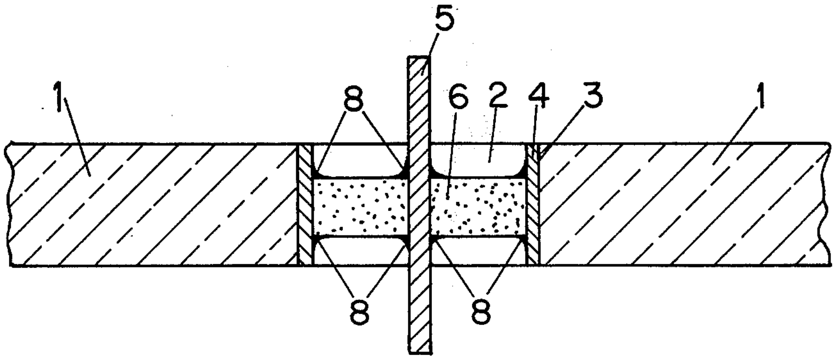
FIG. 3 is a completed soldered vacuum-tight joint.

FIG. 3 shows the completed vacuum-tight soldered joint, the plug 6 including a mixture of a ceramic powder and powdered solder, or a mixture of coated metal powder and powdered solder, thus eliminating the need for the plate of solder 7. Heat treatment has created solder fillets 8 both at the metallized layer 4 and at the through-connection 5.

Figure 2:
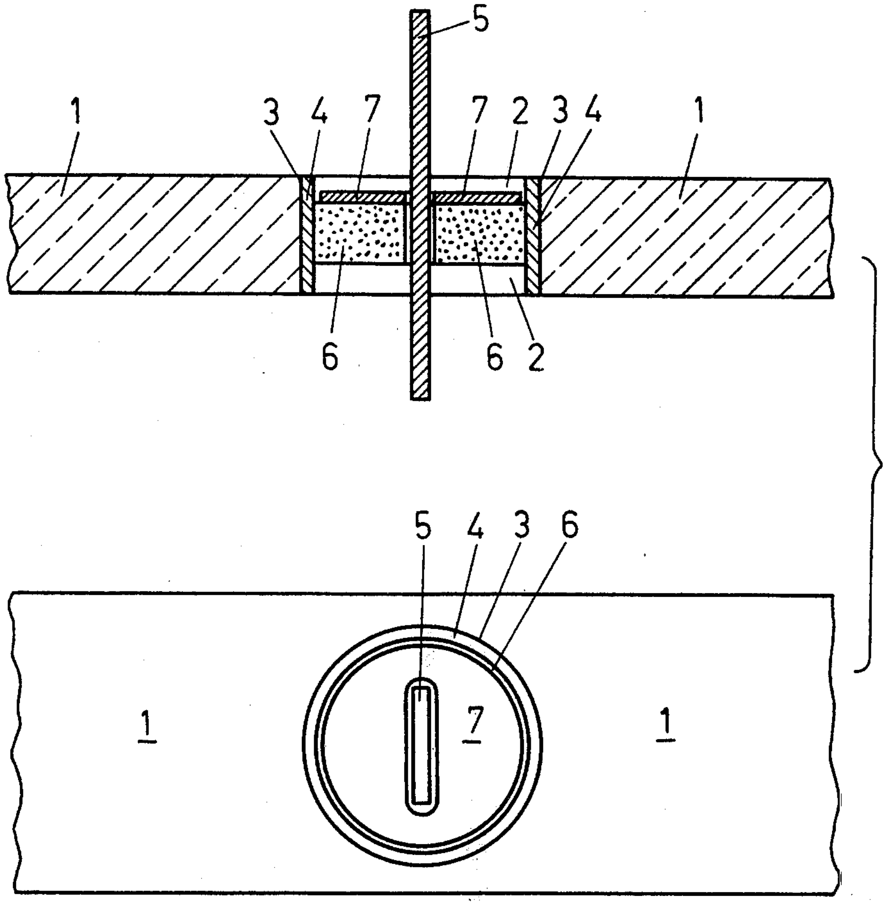
FIG. 2 is a cross-section through the same ceramic plate as in FIG. 1 with a plug in place and a plate of solder on top thereof, and a plan view of this arrangement.

The method of producing a vacuum-tight metal-ceramic soldered joint will now be described in more detail with reference to FIGS. 1 to 3.

The inside walls 3 of the aperture 2 defined in ceramic plate 1 are metallized in known manner, by for example, sintering such that the inner surface of the aperture is completely covered by a metallized layer 4 which can bond with the solder. The plug 6, incorporating a hole to accommodate the electrical and mechanical through-connection 5, is located in the aperture 2. The plug includes a metal powder, a coated ceramic powder, a mixture of powdered solder and coated metal powder, or a mixture of powdered solder and a ceramic powder. The through-connection 5 is inserted in the hole provided in plug 6 and, if the plug 6 does not include a mixture of powdered solder and metal or ceramic powder, the plug is covered with a plate of solder 7. The aperture prepared in this manner is then heated to the liquidus temperature of the solder, whereupon the material of the plug 6 bonds with the material of the solder plate 7, and at the same time, the through-connection 5 and the inside walls of the metallized layer 4 are firmly soldered to the plug 6, thus creating a vacuum-tight joint which will also withstand mechanical stresses.

When mixtures of powdered solder and coated metal powder, or of powdered solder and ceramic powder are used for the plug 6, there is no need to lay a plate of solder 7 on the plug 6 prior to heat treatment, because these materials, under the influence of heat, form an intimate bond both with the through-connection 5 and with the metallized layer 4, thus ensuring an efficient soldered joint.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A vacuum-tight metal-ceramic soldered joint comprising:

a ceramic member having an aperture defined therein, a metallic layer on the wall of said aperture, a solderable plug, an aperture defined within said solderable plug; and an electrical and mechanical through-connection disposed within said aperture of said solderable plug;

said solderable plug comprising fused metal powder and solder and positioned in said aperture of said ceramic member bonding together said metallic layer and said through-connection.

2. A vacuum-tight soldered joint as set forth in claim 1, wherein said solderable plug comprises a coated ceramic powder.

3. A vacuum-tight soldered joint as set forth in claim 1, further comprising a plate of solder positioned on said plug.

4. A vacuum-tight soldered joint as set forth in claim 1, wherein said plug comprises a mixture of powdered solder and ceramic powder.

5. A vacuum-tight soldered joint as set forth in claim 1, wherein said plug comprises a mixture of powdered solder and coated metal powder.

6. A vacuum-tight soldered joint as set forth in claim 1, wherein: said plug comprises a refined metal powder.

7. A vacuum-tight soldered joint as set forth in claim 1, wherein: said plug comprises metalized ceramic powder.

8. A vacuum-tight soldered joint as set forth in claim 1, wherein: said plug comprises a mixture of powdered solder and refined metal powder.

9. A vacuum-tight soldered joint as set forth in claim 3, wherein: said solder plate is disposed above said plug.

10. A vacuum-tight soldered joint as set forth in claim 5, wherein: the grain size of the metal particles of said plug is between 10 and 100$\mu$.

* * * * *